T. BOYD.
FRUIT-PICKER.
No. 186,921.  Patented Feb. 6, 1877.
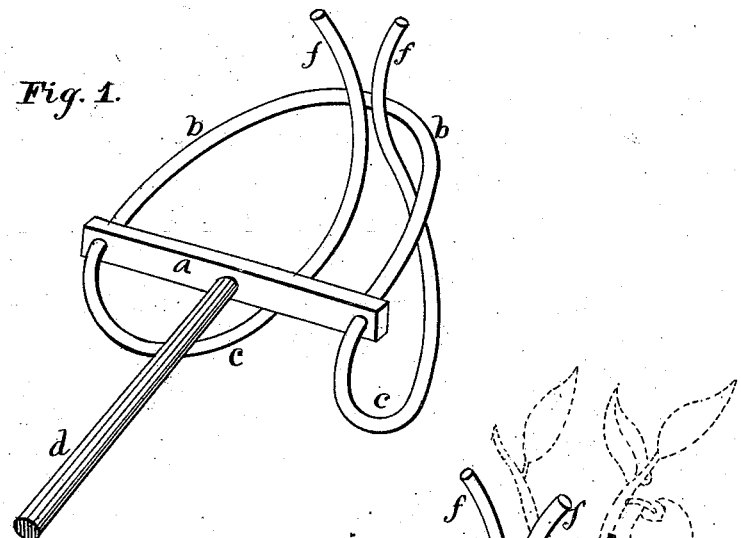
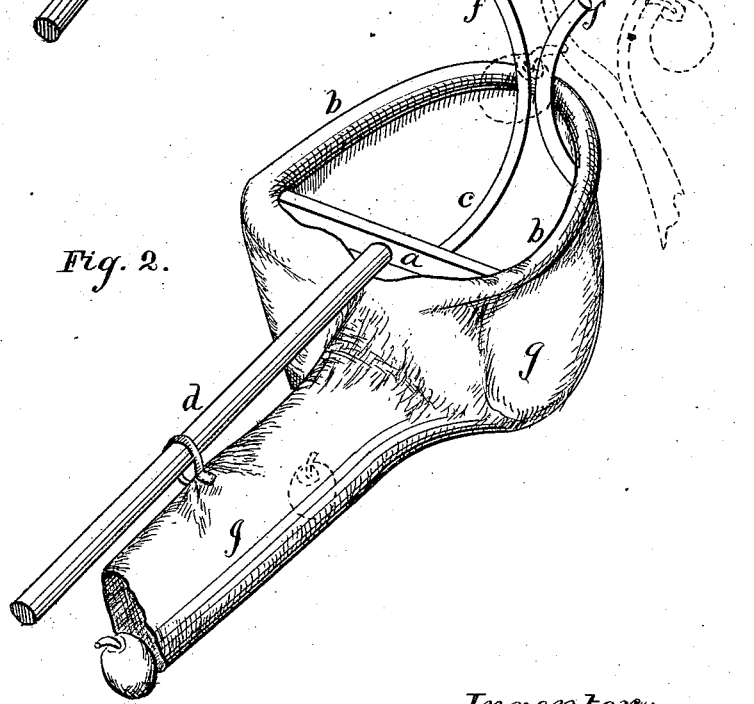
Witnesses:  Inventor:
W R Wright  Thomas Boyd
M E Orwig  By Thomas G Orwig atty.

UNITED STATES PATENT OFFICE.

THOMAS BOYD, OF DES MOINES, IOWA.

IMPROVEMENT IN FRUIT-PICKERS.

Specification forming part of Letters Patent No. 186,921, dated February 6, 1877; application filed August 15, 1876.

*To all whom it may concern:*

Be it known that I, THOMAS BOYD, of Des Moines, in the county of Polk and State of Iowa, have invented an Improved Fruit-Picker, of which the following is a specification:

The object of my invention is to provide a means for picking fruit from elevated positions, and conducting the same to a vessel or upon the ground without bruising the fruit, and without climbing.

It consists in forming a skeleton-frame and hose or sleeve holder, having elastic fingers or tines, upon a rod, pole, or handle, as hereinafter fully set forth.

Figure 1 of my drawing is a perspective view, illustrating the construction of my skeleton fruit-picker frame, having elastic forked tines. Fig. 2 is a perspective view, showing a sack or pocket and sleeve combined with the skeleton frame, as required, to receive and convey the fruit as it is picked off the trees by means of the elastic tines.

$a$ represents a cross-bar, rigidly fixed on the top end of a rod, pole, or handle, $d$. It may be made of wood or any other suitable material, and vary in size, as desired. $b\,c\,f$ is a metal frame, secured to the cross-bar $a$. $b\,b$ is a semicircular horizontal bow or rim standing forward at right angles from the cross-bar $a$. $c\,c$ are semicircular parallel and vertical bows standing forward and downward from the ends of the cross-bar $a$. The front portions of these bows $c$ incline toward each other, and terminate in forked and elastic fingers $f\,f$, which fingers are inside of the horizontal bow $b\,b$. The bow $b\,b$ forms a bearing against which the tines $f\,f$ rest together in their normal condition. In the act of picking fruit they separate to seize the fruit-stem, and in opening and closing they slide to and from each other upon the curved front of the bow $b\,b$. $g\,g$ in Fig. 2 represents a flexible pocket and sleeve, combined with the skeleton frame $a\,b\,c\,f$, as required, to receive, convey, and lower the fruit from its elevated position as it is picked off by means of the forked elastic tines $f\,f$ being pressed upward by the operator while the stem of the fruit is in position between them, as shown in Fig. 2.

The bows $b\,b$ and $c\,c$ may be formed complete from one piece of elastic wire, or they may be formed separately and secured to the cross-bar $a$ in any suitable way.

I claim as my invention—

1. In a fruit-picker, the cross-bar $a$ on a handle, $d$, the horizontal bow $b\,b$, the vertical bows $c\,c$, terminating in elastic forked tines $f\,f$, constructed and combined substantially as and for the purposes shown and described.

2. The combination of the skeleton frame $a\,b\,c\,f$, and the combined pocket and sleeve $g\,g$, substantially as and for the purposes shown and described.

THOMAS BOYD.

Witnesses:
 G. A. SMITH,
 R. G. ORWIG.